United States Patent
Huang

(10) Patent No.: US 11,491,921 B1
(45) Date of Patent: Nov. 8, 2022

(54) SNOWBOARD FIXING FRAME

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/381,601

(22) Filed: Jul. 21, 2021

(51) Int. Cl.
*B60R 9/12* (2006.01)
*B60R 9/06* (2006.01)

(52) U.S. Cl.
CPC . *B60R 9/12* (2013.01); *B60R 9/06* (2013.01)

(58) Field of Classification Search
CPC .................................... B60R 9/06; B60R 9/12
USPC ........................................................ 224/488
See application file for complete search history.

(56) References Cited

U.S. PATENT DOCUMENTS

| | | | | |
|---|---|---|---|---|
| 3,854,641 | A * | 12/1974 | Kohls | B60R 9/12 224/323 |
| 5,181,822 | A * | 1/1993 | Allsop | B60R 9/06 414/462 |
| 5,842,615 | A * | 12/1998 | Goodness | B60R 9/10 224/924 |
| 2005/0205630 | A1* | 9/2005 | Cooper | B60R 9/12 224/521 |
| 2007/0057000 | A1* | 3/2007 | Webster | B60R 9/06 224/531 |
| 2007/0194070 | A1* | 8/2007 | Rash | B60R 9/08 224/525 |
| 2021/0178980 | A1* | 6/2021 | Wang | B60R 9/06 |
| 2022/0017020 | A1* | 1/2022 | McFadden | B60R 9/06 |
| 2022/0126759 | A1* | 4/2022 | Robinson | B60R 9/12 |
| 2022/0176886 | A1* | 6/2022 | Sailer | B60R 9/06 |

* cited by examiner

*Primary Examiner* — Peter N Helvey
(74) *Attorney, Agent, or Firm* — Muncy, Geissler, Olds & Lowe, P.C.

(57) ABSTRACT

A snowboard fixing frame includes a frame body, a fixing assembly, an restricting member and a locking mechanism. The fixing assembly is disposed on the frame body and includes a first rod and a second rod for clamping a snowboard. The restricting member is disposed on the first rod. The restricting member has a first restricting portion. The locking mechanism includes a base, a core member, a locking member and an elastic member. The base is disposed on the second rod and within a first hole. The core member is rotatable with the locking member.

10 Claims, 8 Drawing Sheets

SNOWBOARD FIXING FRAME

BACKGROUND OF THE INVENTION

Field of the Invention

The present invention relates to a snowboard fixing frame.

Description of the Prior Art

The snowboard is too long to be placed in the vehicle, so it is necessary to use a specific fixing frame to fix the snowboard, wherein the fixing frame is generally mounted to the roof or the back of the vehicle. However, the conventional snowboard fixing frame is worse in anti-theft, or the operation process of the fixed frame with good anti-theft effect is cumbersome, which makes the snowboard easy to be stolen or causes inconvenience when the user accesses the snowboard.

The present invention is, therefore, arisen to obviate or at least mitigate the above-mentioned disadvantages.

SUMMARY OF THE INVENTION

The main object of the present invention is to provide a snowboard fixing frame which facilitates installation/uninstallation of a snowboard and is burglarproof To achieve the above and other objects, the present invention provides a snowboard fixing frame, including: a frame body, configured to be connected to a vehicle; a fixing assembly, disposed on the frame body, including a first rod and a second rod, at least one of the first rod and the second rod being rotatable relative to the frame body to clamp a snowboard; a restricting member, disposed on the first rod, the restricting member including a first restricting portion; a locking mechanism, including a base, a core member, a locking member and an elastic member, the base being disposed on the second rod and including a first through hole, the locking member being movable with the core member and disposed in the base, the locking member being rotatable relative to the base between a first position and a second position, the locking member including a side face and a second restricting portion, the elastic member being abutted between the locking member and the base to bias the locking member toward the first position, the side face being tilted to a direction in which the first through hole is open and at least partially corresponding to the first through hole; wherein when the first rod and the second rod contact each other, the restricting member is inserted within the first through hole and abutted against the side face and the locking member is located in the second position; when the restricting member is then inserted further into the first through hole and the locking member returns to the first position by action of the elastic member, the second restricting portion is blocked by the first restricting portion so that the restricting member is non-withdrawable from the first through hole; when the core member drives the locking member to rotate to the second position, the second restricting portion is not blocked by the first restricting portion, the restricting member is withdrawable from the first through hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
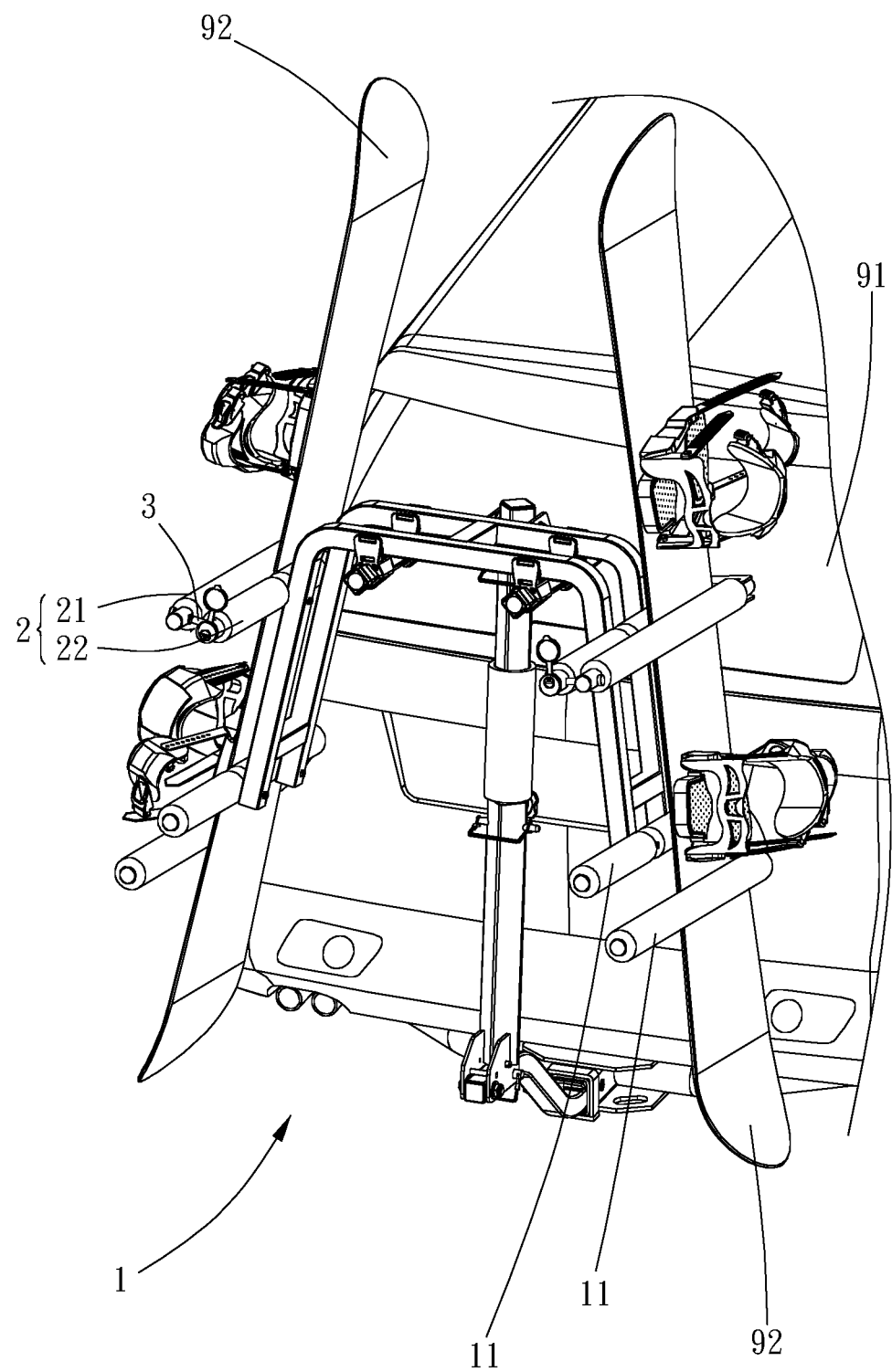
FIG. 1 is a stereogram of a preferable embodiment of the present invention.
Figure 2:
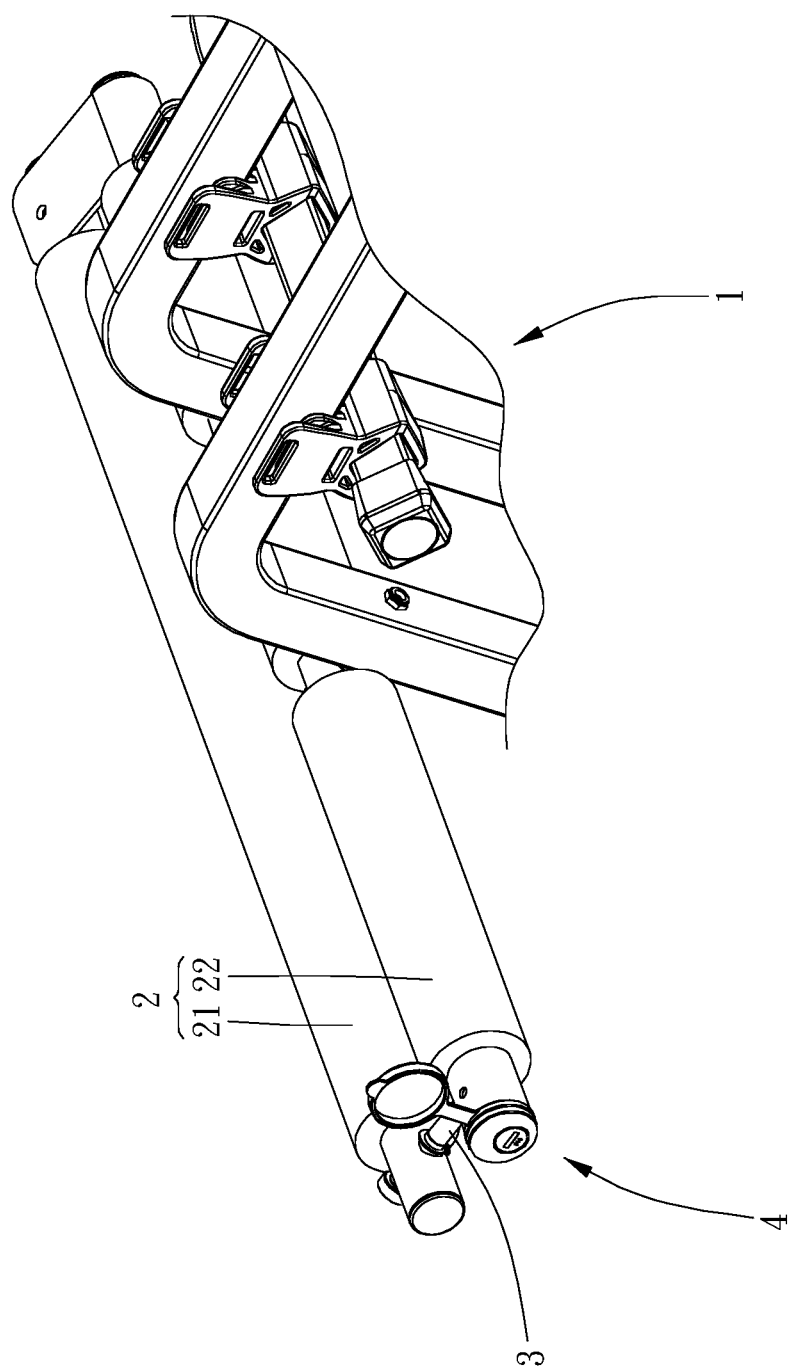
FIGS. 2 and 3 are partial views of a preferable embodiment of the present invention.
Figure 3:
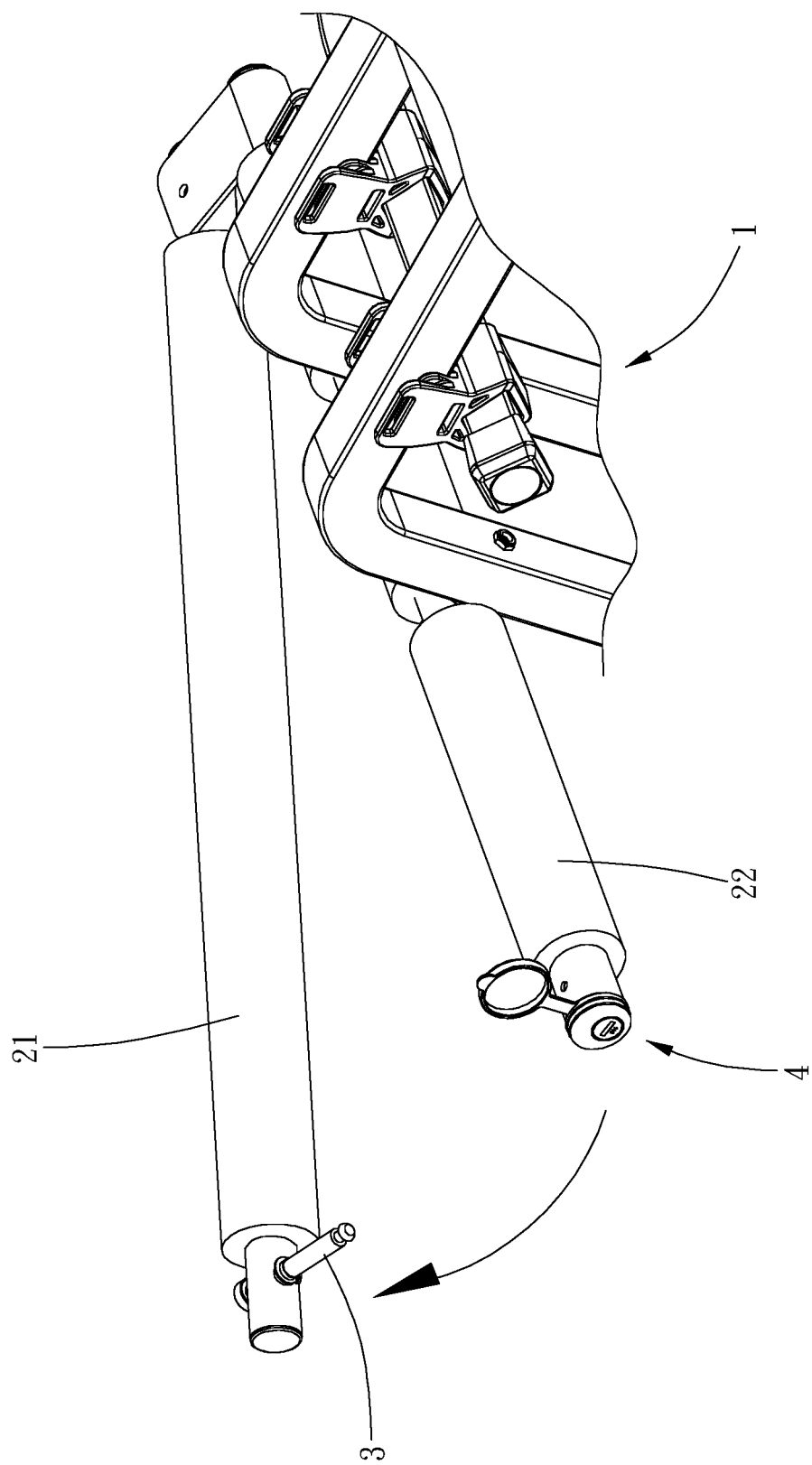
Figure 4:
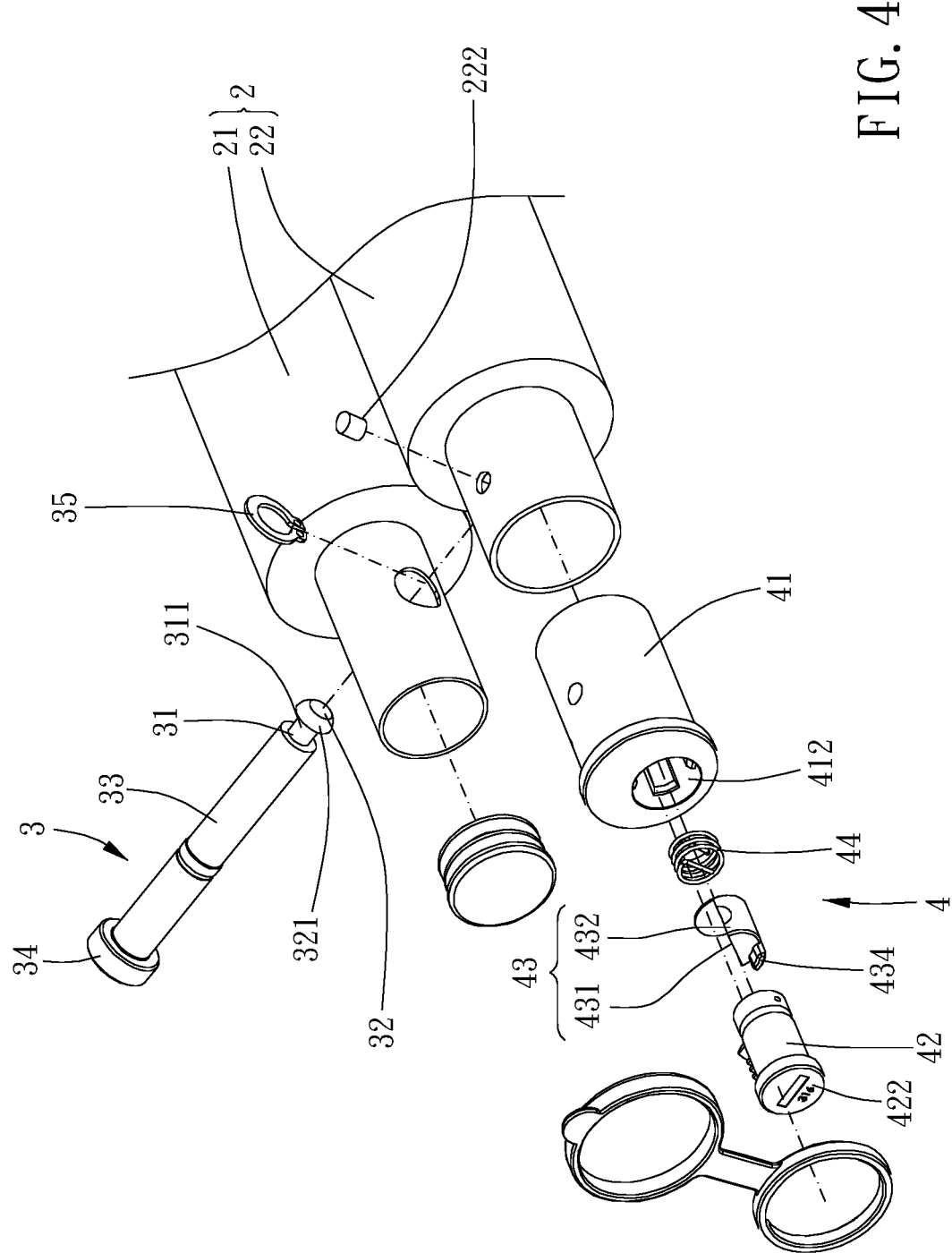
FIGS. 4 and 5 are partial breakdown drawings of a preferable embodiment of the present invention.
Figure 5:
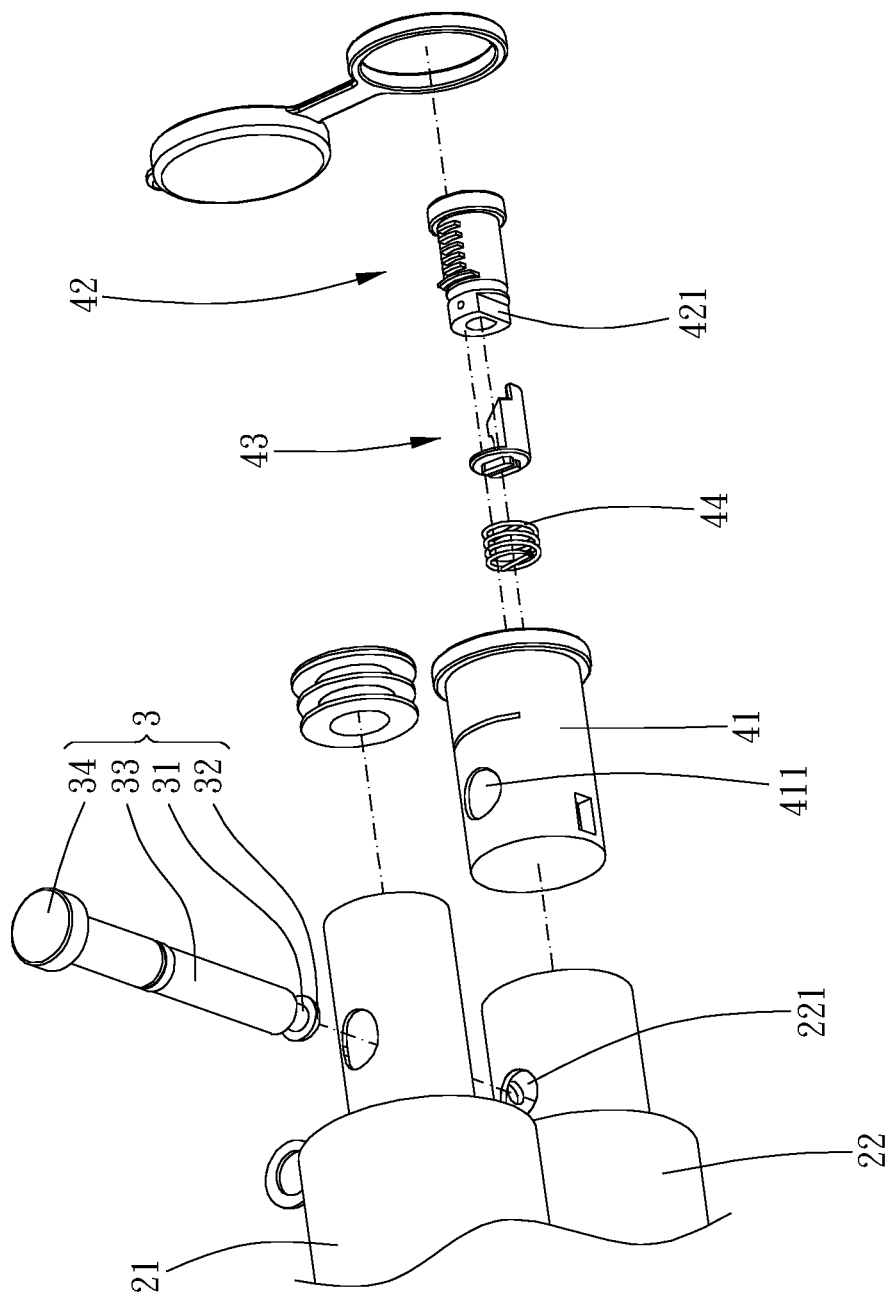
Figure 6:
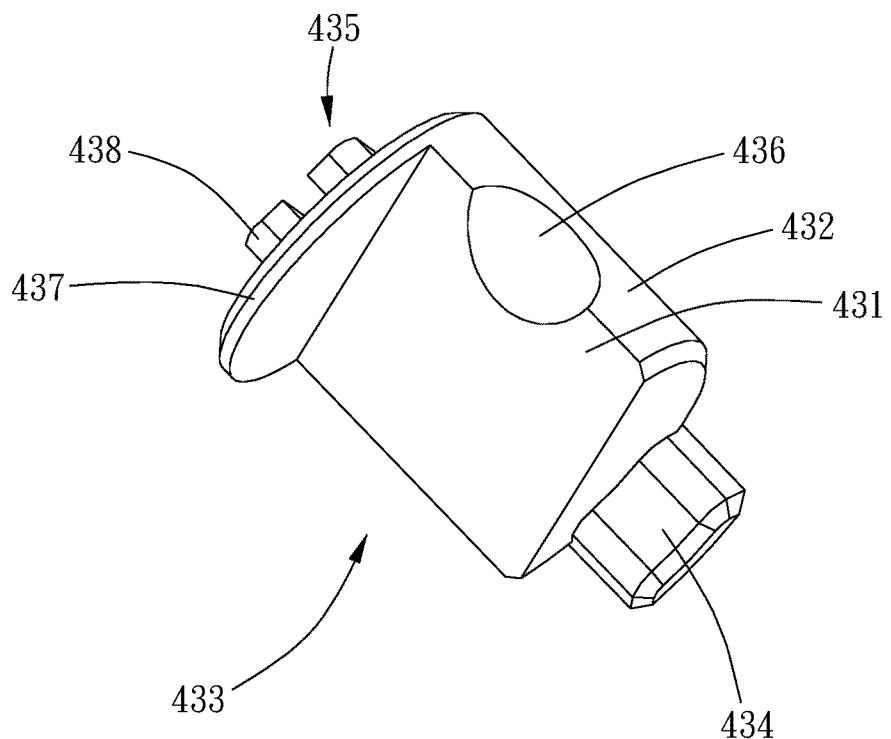
FIGS. 6 and 7 are stereograms showing a locking member of a preferable embodiment of the present invention.
Figure 7:
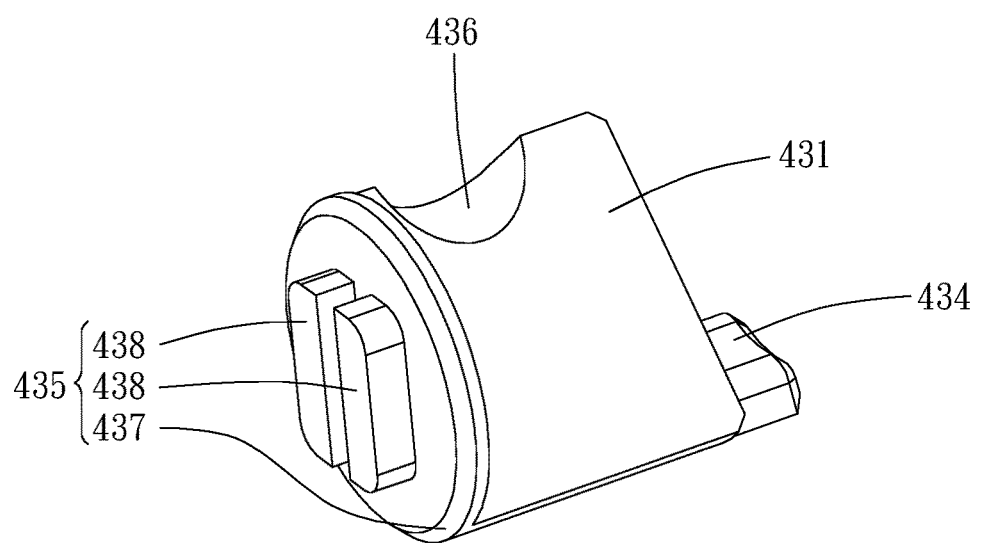
Figure 8:
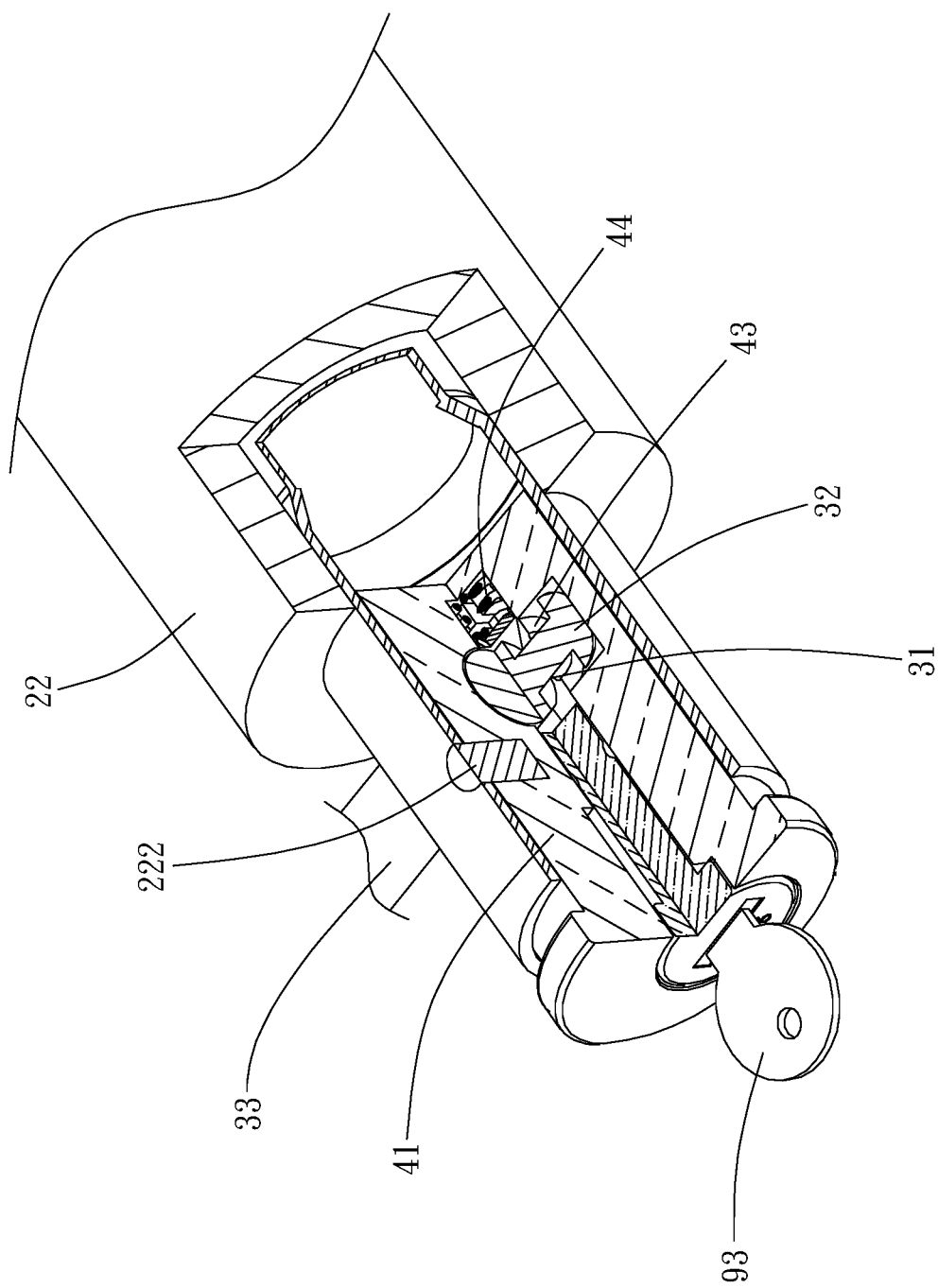
FIG. 8 is a partial cross-sectional view of a preferable embodiment of the present invention.
Figure 9:
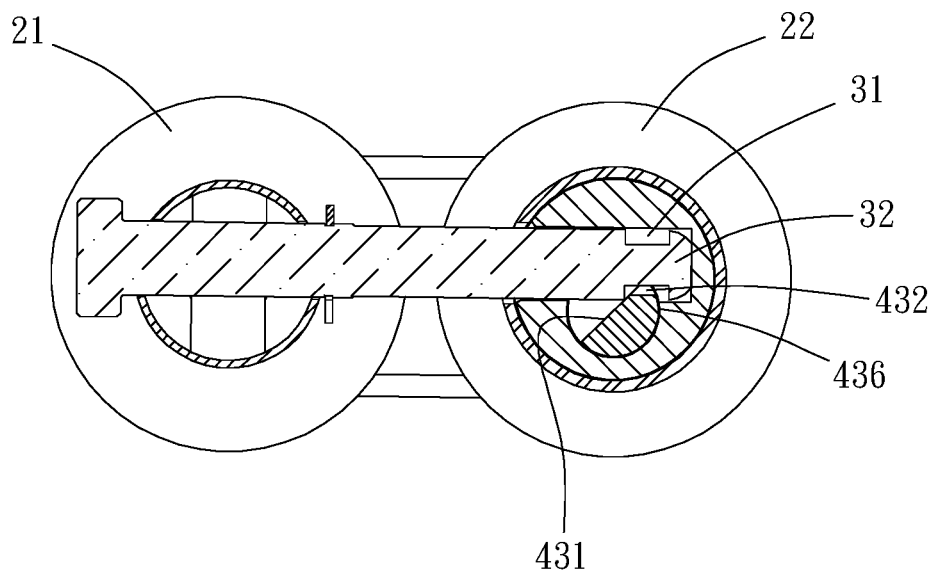
FIGS. 9 and 10 are cross-sectional views showing operation of different driving heads.
Figure 10:
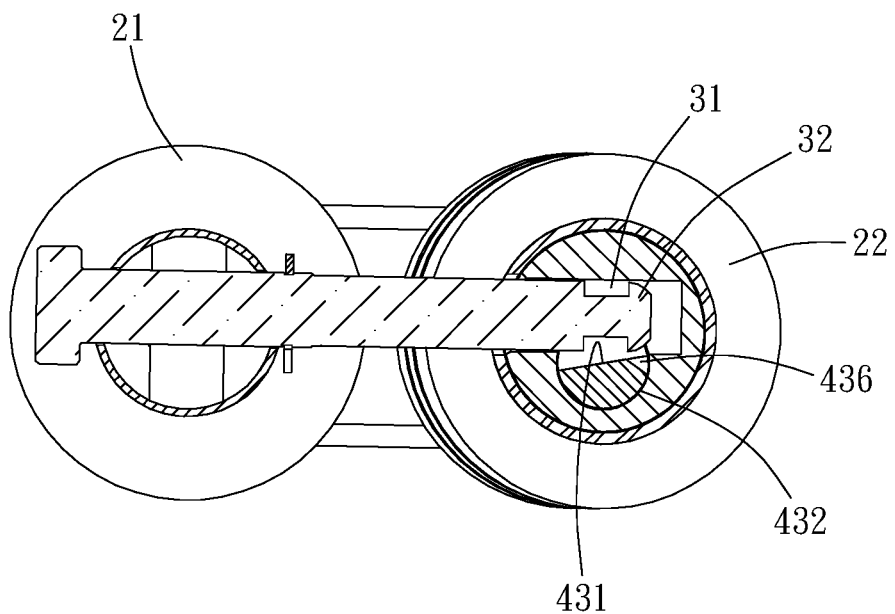

Please refer to FIGS. 1 to 10 for a preferable embodiment of the present invention. A snowboard fixing frame 1 of the present invention includes a frame body 1, a fixing assembly 2, a restricting member 3 and a locking mechanism 4.

The frame body 1 is configured to be connected to a vehicle 91. In this embodiment, the frame body 1 is connected to a rear portion of the vehicle 91; however, the frame body 1 may be connected to a top portion of the vehicle 91.

The fixing assembly 2 is disposed on the frame body 1 and includes a first rod 21 and a second rod 22, and at least one of the first rod 21 and the second rod 22 is rotatable relative to the frame body 1 to clamp a snowboard 92. In this embodiment, the frame body 1 further includes two fixation rods 11 defining an interval therebetween for insertion of the snowboard 92, and the two fixation rods 11 and the fixing assembly 2 are located at different levels so that the snowboard 92 can be secured upright.

The restricting member 3 is disposed on the first rod 21, and the restricting member 3 includes a first restricting portion 31.

The locking mechanism 4 includes a base 41, a core member 42, a locking member 43 and an elastic member 44. The base 41 is disposed on the second rod 22 and includes a first through hole 411. The locking member 43 is movable with the core member 42 and disposed in the base 41, and the locking member 43 is rotatable relative to the base 41 between a first position and a second position. The locking member 43 includes a side face 431 and a second restricting portion 432, and the elastic member 44 is abutted between the locking member 43 and the base 41 to bias the locking member 43 toward the first position. The side face 431 is tilted to a direction in which the first through hole 411 is open and at least partially corresponding to the first through hole 411. In this embodiment, the elastic member 44 is a coil spring and fixedly connected to the base 41 so that the core member 42 can return automatically.

In this embodiment, the base 41 includes a receiving hole 412, the core member 42 is received in the receiving hole 412, an end of the core member 42 remote from the locking member 43 further includes a keyhole 422 for insertion of a key 93. The core member 42 is not rotatable relative to the base 41 until the key 93 is inserted in the keyhole 422.

When the first rod 21 and the second rod 22 contact each other, the restricting member 3 is inserted within the first through hole 411 and abutted against the side face 431 and the locking member 43 is located in the second position; as the restricting member 3 is then inserted further into the first through hole 411 and the locking member 43 returns to the first position by action of the elastic member 44, the second restricting portion 432 is blocked by the first restricting portion 31 so that the restricting member 3 is non-withdrawable from the first through hole 411 and so that the snowboard 92 is secured and locked to the frame body 1. The snowboard 92 can be removed from the frame body 1 as the core member 42 is rotated to drive the locking member 43 to the second position, where the second restricting portion 432 is not blocked by the first restricting portion 31 such that the restricting member 3 is withdrawable from the first through hole 411. As the first rod 21 and the second rod 22 swing away from each other and the restricting member 3 is withdrawn from the first through hole 411, the snowboard 92 is removable from the snowboard fixing frame, which is convenient and burglarproof Specifically, the restricting member 3 includes an abutting portion 32 and a body portion 33, and the first restricting portion 31 is disposed between the body portion 33 and the abutting portion 32. In this embodiment, an end of the body portion 33 remote from the first restricting portion 31 includes a head portion 34 enlarged, the body portion 33 is disposed through the first rod 21, the head portion 34 is blocked at a side of the first rod 21 remote from the second rod 22, a C-retainer 35 is detachably disposed around the body portion 33, and the C-retainer 35 is blocked on a side of the first rod 21 toward the second rod 22 so as to secure the restricting member 3 to the first rod 21.

Preferably, a side of the abutting portion 32 remote from the body portion 33 includes a semi-spherical surface 321, the first restricting portion 31 includes an annular groove 311, the body portion 33 is non-movably disposed through the first rod 21, and the second restricting portion 432 is disengageably engaged within the annular groove 311. Since the semi-spherical surface 321 is abutted against the side face 431, the locking member 43 can be driven, by the side face 431, to rotate to the second position.

Specifically, the locking member 43 includes a rotatable portion 433, a first assembling portion 434 and a second assembling portion 435 which are connected with two ends of the rotatable portion 433. The side face 431 and the second restricting portion 432 are disposed on the rotatable portion 433; the first assembling portion 434 is assembled with the core member 42 so that the core member 42 is rotatable with the locking member 43; the second assembling portion 435 is assembled with the elastic member 44 so that the elastic member 44 bias the second assembling portion 435 toward the first position.

In this embodiment, the rotatable portion 433 includes a semi-cylinder, the first restricting portion 31 is an arced surface of the semi-cylinder, and a first notch 436 is disposed between the first restricting portion 31 and the side face 431. When the semi-spherical surface 321 is abutted against the side face 431, the locking member 43 can return to the first position via the first notch 436 so that the second restricting portion 432 can be engaged with the first restricting portion 31.

The first assembling portion 434 axially projects from the rotatable portion 433 and is eccentric relative to an axial direction of the rotatable portion 433, a second notch 421 is disposed on a side of the core member 42 toward the locking member 43 and is eccentric relative to an axial direction of the core member 42, and the first assembling portion 434 is inserted within the second notch 421 so that the core member 42 is rotatable with the locking member 43.

Specifically, the second assembling portion 435 includes a blocking wall 437 and two projections 438, an end of the rotatable portion 433 remote from the core member 42 includes the blocking wall 437 extending radially, an end of the blocking wall 437 remote from the rotatable portion 433 includes the two projections 438 extending axially, and an end of the elastic member 44 is disposed between the two projections between so that the elastic member 44 can drive the locking member 43 to rotate.

Preferably, the base 41 is inserted within the second rod 22, the second rod 22 includes a second through hole 221 disposed radially therethrough and corresponding to the first through hole 411 so that the first rod 21 can be inserted into the first through hole 411 easily, and a pin 222 is inserted radially within the base 41 and the second rod 22 to secure the base 41 to the second rod 22. The base 41 may be non-detachably fixed to the second rod 22 by welding, for example.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A snowboard fixing frame, including:
   a frame body, configured to be connected to a vehicle;
   a fixing assembly, disposed on the frame body, including a first rod and a second rod, at least one of the first rod and the second rod being rotatable relative to the frame body to clamp a snowboard;
   a restricting member, disposed on the first rod, the restricting member including a first restricting portion;
   a locking mechanism, including a base, a core member, a locking member and an elastic member, the base being disposed on the second rod and including a first through hole, the locking member being movable with the core member and disposed in the base, the locking member being rotatable relative to the base between a first position and a second position, the locking member including a side face and a second restricting portion, the elastic member being abutted between the locking member and the base to bias the locking member toward the first position, the side face being tilted to a direction in which the first through hole is open and at least partially corresponding to the first through hole;
   wherein when the first rod and the second rod contact each other, the restricting member is inserted within the first through hole and abutted against the side face and the locking member is located in the second position; when the restricting member is then inserted further into the first through hole and the locking member returns to the first position by action of the elastic member, the second restricting portion is blocked by the first restricting portion so that the restricting member is non-withdrawable from the first through hole; when the core member drives the locking member to rotate to the second position, the second restricting portion is not blocked by the first restricting portion, the restricting member is withdrawable from the first through hole.
2. The snowboard fixing frame of claim 1, wherein the restricting member includes an abutting portion and a body portion, and the first restricting portion is disposed between the body portion and the abutting portion.
3. The snowboard fixing frame of claim 2, wherein an end of the body portion remote from the first restricting portion includes a head portion enlarged, the body portion is disposed through the first rod, the head portion is blocked at a side of the first rod remote from the second rod, a C-retainer is detachably disposed around the body portion, and the C-retainer is blocked on a side of the first rod toward the second rod.

4. The snowboard fixing frame of claim 2, wherein a sides of the abutting portion remote from the body portion includes a semi-spherical surface, the first restricting portion includes an annular groove, the body portion is non-movably disposed through the first rod, and the second restricting portion is disengageably engaged within the annular groove.

5. The snowboard fixing frame of claim 1, wherein the locking member includes a rotatable portion, a first assembling portion and a second assembling portion which are connected with two ends of the rotatable portion, the side face and the second restricting portion are disposed on the rotatable portion, the first assembling portion is assembled with the core member, and the second assembling portion is assembled with the elastic member.

6. The snowboard fixing frame of claim 5, wherein the rotatable portion includes a semi-cylinder, the first restricting portion is an arced surface of the semi-cylinder, and a first notch is disposed between the first restricting portion and the side face.

7. The snowboard fixing frame of claim 5, wherein the first assembling portion axially projects from the rotatable portion and is eccentric relative to an axial direction of the rotatable portion, a second notch is disposed on a side of the core member toward the locking member and is eccentric relative to an axial direction of the core member, and the first assembling portion is inserted within the second notch.

8. The snowboard fixing frame of claim 5, wherein the second assembling portion includes a blocking wall and two projections, an end of the rotatable portion remote from the core member includes the blocking wall extending radially, an end of the blocking wall remote from the rotatable portion includes the two projections extending axially, and an end of the elastic member is disposed between the two projections.

9. The snowboard fixing frame of claim 1, wherein the base is inserted within the second rod, the second rod includes a second through hole disposed radially therethrough and corresponding to the first through hole, and a pin is inserted within the base and the second rod.

10. The snowboard fixing frame of claim 3, wherein a sides of the abutting portion remote from the body portion includes a semi-spherical surface, the first restricting portion includes an annular groove, the body portion is non-movably disposed through the first rod, and the second restricting portion is disengageably engaged within the annular groove; the locking member includes a rotatable portion, a first assembling portion and a second assembling portion which are connected with two ends of the rotatable portion, the side face and the second restricting portion disposed on the rotatable portion, the first assembling portion is assembled with the core member, and the second assembling portion is assembled with the elastic member; the rotatable portion includes a semi-cylinder, the first restricting portion is an arced surface of the semi-cylinder, and a first notch is disposed between the first restricting portion and the side face; the first assembling portion axially projects from the rotatable portion and is eccentric relative to an axial direction of the rotatable portion, a second notch is disposed on a side of the core member toward the locking member and is eccentric relative to an axial direction of the core member, and the first assembling portion is inserted within the second notch; the second assembling portion includes a blocking wall and two projections, an end of the rotatable portion remote from the core member includes the blocking wall extending radially, an end of the blocking wall remote from the rotatable portion includes the two projections extending axially, and an end of the elastic member is disposed between the two projections; the base is inserted within the second rod, the second rod includes a second through hole disposed radially therethrough and corresponding to the first through hole, and a pin is inserted within the base and the second rod; the elastic member is a coil spring and fixedly connected to the base; the base includes a receiving hole, the core member is received in the receiving hole; an end of the core member remote from the locking member further includes a keyhole for insertion of a key, the core member is not rotatable relative to the base until the key is inserted in the keyhole; the frame body further includes two fixation rods defining an interval therebetween for insertion of the snowboard, and the two fixation rods and the fixing assembly are located at different levels.

* * * * *